United States Patent
Algreatly

(10) Patent No.: US 9,524,282 B2
(45) Date of Patent: Dec. 20, 2016

(54) DATA AUGMENTATION WITH REAL-TIME ANNOTATIONS

(71) Applicant: Cherif Atia Algreatly, Fremont, CA (US)

(72) Inventor: Cherif Atia Algreatly, Fremont, CA (US)

(73) Assignee: Cherif Algreatly, Fremont, CA (US)

( * ) Notice: Subject to any disclaimer, the term of this patent is extended or adjusted under 35 U.S.C. 154(b) by 716 days.

(21) Appl. No.: 13/762,357

(22) Filed: Feb. 7, 2013

(65) Prior Publication Data

US 2014/0223279 A1  Aug. 7, 2014

(51) Int. Cl.

| G06F 17/24 | (2006.01) |
| G06T 19/00 | (2011.01) |
| G06T 11/00 | (2006.01) |
| G11B 27/28 | (2006.01) |
| G11B 27/32 | (2006.01) |

(52) U.S. Cl.
CPC ............ *G06F 17/241* (2013.01); *G06T 11/00* (2013.01); *G06T 19/006* (2013.01); *G11B 27/28* (2013.01); *G11B 27/322* (2013.01)

(58) Field of Classification Search
CPC .............. G06F 17/241; G06F 17/3082; G06Q 17/2247; G06T 11/00; G06T 19/006; G11B 27/28; G11B 27/322; G11B 27/105; G06K 9/00288
USPC ................................. 715/233, 230
See application file for complete search history.

(56) References Cited

U.S. PATENT DOCUMENTS

| 7,574,054 | B2 * | 8/2009 | Gallagher .......... G06K 9/00697 382/115 |
| 8,213,689 | B2 * | 7/2012 | Yagnik ............. G06F 17/30781 382/118 |
| 8,385,588 | B2 * | 2/2013 | Jacoby et al. ................ 382/100 |
| 8,806,320 | B1 * | 8/2014 | Abdo ............................. 715/203 |
| 8,903,798 | B2 * | 12/2014 | El-Saban et al. ............. 707/708 |
| 8,917,908 | B2 * | 12/2014 | Roberts et al. ............... 382/103 |
| 8,935,265 | B2 * | 1/2015 | Tang ............................ 707/754 |
| 8,971,591 | B2 * | 3/2015 | Kovtun ............. G06K 9/00288 382/115 |
| 2004/0093349 | A1 * | 5/2004 | Buinevicius .......... G06Q 10/00 |
| 2007/0256008 | A1 * | 11/2007 | Bedingfield, Sr. ............ 715/512 |
| 2008/0235724 | A1 * | 9/2008 | Sassenscheidt ... G06F 17/30793 725/32 |
| 2008/0236904 | A1 * | 10/2008 | Zukowski et al. ......... 178/18.03 |
| 2008/0276159 | A1 * | 11/2008 | Narayanaswami et al. .. 715/202 |
| 2009/0307618 | A1 * | 12/2009 | Lawler et al. ................ 715/764 |
| 2011/0099195 | A1 * | 4/2011 | Patwardhan et al. ......... 707/769 |
| 2011/0243397 | A1 * | 10/2011 | Watkins ............ G06F 17/30259 382/118 |
| 2013/0283143 | A1 * | 10/2013 | Petajan et al. ................ 715/230 |

(Continued)

FOREIGN PATENT DOCUMENTS

EG  WO 2012007015 A1 * 1/2012 .......... G06Q 10/101

Primary Examiner — Michael Zarroli

(57) ABSTRACT

A system for augmenting a user experience, such as viewing a scene or listening to an audio, is disclosed. The system provides the user with real time annotations for the part of the scene s/he is viewing or the part of the audio s/he is listening to. The scene may include text, objects, human faces or bodies. The audio may include vocal information or musical themes. The annotations include a list of users who are simultaneously viewing similar scenes or simultaneously listening to similar audio.

20 Claims, 14 Drawing Sheets

(56) References Cited

U.S. PATENT DOCUMENTS

| | | | |
|---|---|---|---|
| 2014/0068406 A1* | 3/2014 | Kornacki | 715/230 |
| 2014/0164927 A1* | 6/2014 | Salaverry et al. | 715/727 |

* cited by examiner

DATA AUGMENTATION WITH REAL-TIME ANNOTATIONS

CROSS-REFERENCE TO RELATED PATENT APPLICATION

Background

Presenting digital data on computers, tablets, mobile phones, or TV screens opens the door for clarifications regarding the displayed digital data. Viewing scenes in daily life creates queries related to the scene contents especially when looking at places, objects, or people that are new to us. Listening to audios of vocal languages that convey information, or melodies that carry musical themes, initiate question marks related to the perceived information or music. Generally, providing additional information, in real time, related to what we see or hear can dramatically change our perception of the world around us and accordingly, improve the way we learn, communicate, and work. In fact, until now there has been no universal system or method that helps achieve the aforementioned goal or objective.

SUMMARY

The present invention introduces a system and method for providing additional information, in real time, related to what is seen or heard in daily life, creating a substantial number of innovative solutions and applications that improve the user's learning, communication, and productivity.

In one embodiment, the present invention discloses a system for augmenting a user experience viewing a scene to provide real time annotations and a list of users who are simultaneously viewing similar parts of scenes. The system is comprised of: a displaying unit comprised of a camera and a first screen; a tracking unit; a conversion program; a database; a managing program; an annotations outlet; and an input unit.

The camera takes pictures of the scene and presents them on the first screen. The tracking unit tracks and captures the image of the central part of the scene on the first screen. The conversion program is connected to the tracking unit to recognize and identify the central part with a keyword. The database stores keywords associated with annotations and a list of users who are simultaneously viewing central parts identified with the same keyword. The managing program receives the keyword from the conversion program and accesses the database to retrieve the list and annotations that are related to the central part presented on the first screen. The annotations outlet is comprised of a second screen and a speaker to provide the visual or vocal annotations of the central part. The input unit is comprised of a keyboard and a microphone to provide the database with visual annotations or vocal annotations related to the central part.

In another embodiment, the present invention discloses a system for augmenting a user experience listening to an audio to provide real time annotations and a list of users who are simultaneously listening to similar parts of audios. The system is comprised of a receiving unit; a tracking unit; a conversion program; a database; a managing program; an annotation outlet; and an input unit.

The receiving unit is capable of recording and converting audio into digital data. The tracking unit receives a signal from a user to indicate selecting a part of the audio and extracts the digital data that represents this part. The conversion program is connected to the tracking unit to identify the digital data of the part of the audio with a keyword. The database stores keywords associated with annotations and a list of users who are simultaneously listening to parts of audios identified with the same keyword. The managing program receives the keyword from the conversion program and accesses the database to retrieve the list and annotations that are related to the part of audio selected by the user. The annotation outlet is comprised of a second screen and a speaker to provide the visual annotations or the vocal annotations of the part of the audio. The input unit is comprised of a keyboard and microphone to provide the database with visual annotations or vocal annotations related to a part of the audio.

In one embodiment, the present invention discloses a system for augmenting a user experience viewing digital data to provide real time annotations and a list of users who are simultaneously viewing similar parts of digital data. The system is comprised of a first screen; a tracking unit; a conversion program; a database; a managing program; an annotations outlet; and input unit.

The first screen is capable of presenting digital data. The tracking unit tracks the selected part of digital data by the user on the first screen. The conversion program is connected to the tracking unit to provide a keyword representing the selected part. The database stores keywords associated with annotations and list of users who are simultaneously selecting parts of digital data identified with the same keyword. The managing program receives the keyword from the conversion program and accesses the database to retrieve the list and annotations that are related to the selected part. The annotations outlet is comprised of a second screen and a speaker to provide the visual annotations or the vocal annotations of the selected part. The input unit is comprised of a keyboard and microphone to provide the database with visual annotations or vocal annotations related to a selected part.

The above Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
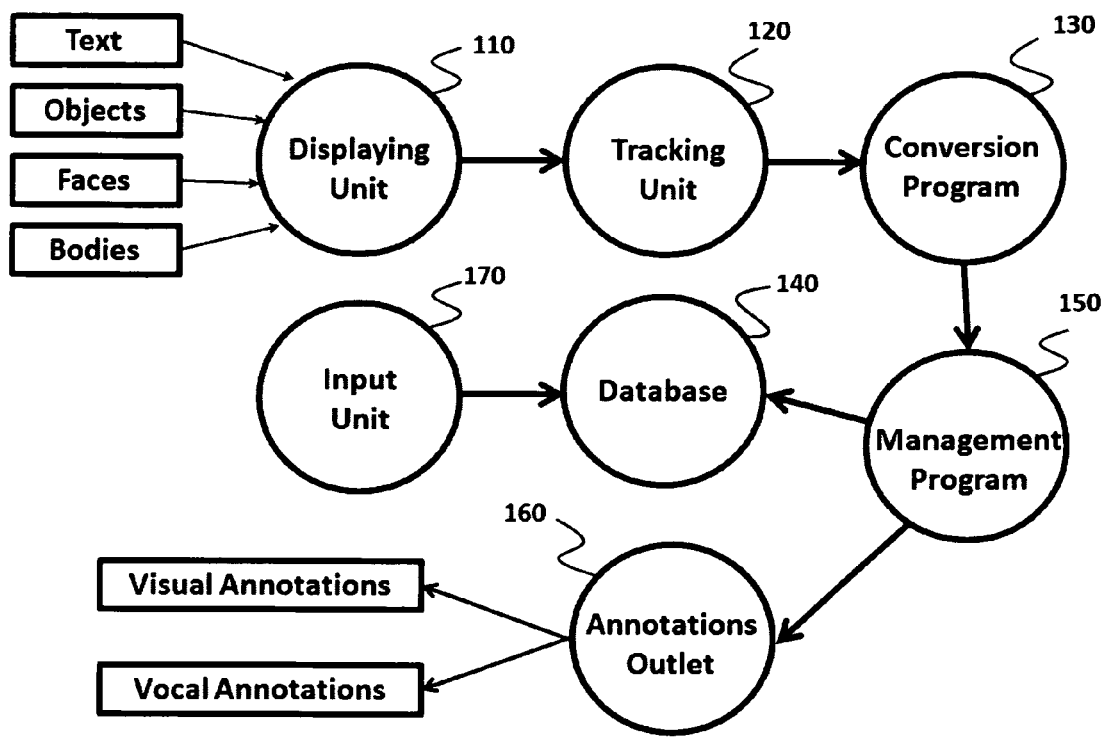
FIG. 1 illustrates a block diagram of a system for augmenting a user experience viewing a scene to provide real time annotations and a list of users who are simultaneously viewing similar parts of scenes.

According to a first technology of the present invention, FIG. 1 illustrates a block diagram of a system for augmenting a user experience viewing a scene to provide a real time list and annotations of users who are simultaneously viewing similar parts of scenes. The system is comprised of; a displaying unit 110 comprised of a camera and a first screen, the camera takes the scene pictures and presents them on the first screen; a tracking unit 120 that tracks and captures the image of the central part of the scene on the first screen; a conversion program 130 connected to the tracking unit to recognize and identify the central part with a keyword; a database 140 that stores keywords associated with a list and annotations of users who are simultaneously viewing central parts identified with the same keyword; a managing program 150 that receives the keyword from the conversion program and accesses the database to retrieve the list and annotations that are related to the central part presented on the first screen; an annotations outlet 160 comprised of a second screen and a speaker to provide the visual annotations or the vocal annotations of the central part; and an input unit 170 comprised of a keyboard and a microphone to provide the database with visual annotations or vocal annotations related to the central part.

The scene content can be text, objects, human faces or bodies among others as shown in the figure. The displaying unit can be a device equipped with a camera and a display such as a mobile phone, tablet, or head mounted computer display in the shape of eye glasses. The tracking unit is a software program utilized with the displaying unit to track and capture the image of the central part of the scene located in the center of the first screen. The conversion program utilizes an optical recognition technique, object recognition technique, facial recognition technique, or body features recognition technique when the scene respectively contains text, objects, human faces, or bodies. The database is located on a server to store visual annotations and vocal annotations. The visual annotations can be a script, images, or videos. The vocal annotations can be vocal information or music. The managing program is located on the server accessing the database and connected to each conversion program and each annotations outlet. The annotations outlet can be a device equipped with a screen to present the visual annotations and a speaker medium to convey the vocal annotations such as a mobile phone, tablet, or computer. The input unit is a device with a unique ID and equipped with a keyboard and a microphone such as a mobile phone, tablet, or computer.

In one embodiment of the first technology of the present invention, the scene content includes text printed on a newspaper, magazine, or book, or displayed on a screen of a computer, TV, or a street sign. The scene is viewed by a camera of a mobile phone. The tracking unit is a program on the mobile phone to detect which part of the scene the user is viewing at the moment by targeting the central part of the text located near the middle of the camera screen. The part of the text could be one column or multiple columns of one article in a page of a magazine or newspaper. The one column is detected by the blank areas that surround the column. The multiple columns of one article are detected by the adjacency of the multiple columns that share a common keyword. The conversion program utilizes an optical character recognition technique, as known in the art, to convert the image of the text into digital text and analyzes this digital text to define its keyword. The managing program is located on a server connected to each mobile phone. The managing program accesses a database that associates each keyword with annotations and list of users who are simultaneously viewing central parts identified with the same keyword.

The annotations and list of users change according to the change of the text that the user is viewing by the mobile phone camera. The annotations can be visual annotations in the form of text, image, or video provided by users and displayed on the second screen of the annotations outlet, which in this case is the screen of the mobile phone. Also, the annotations can be vocal annotations in the form of vocal messages provided by users and heard through the speaker of the annotations outlet, which in this case is the mobile phone speaker. The outlet unit can utilize the screen and speaker of the same mobile phone. In this case, the annotations and list of users appear on the mobile phone screen in a position that does not hide the text. The outlet unit can also utilize the screen and speaker of another device such as a tablet, computer, or TV positioned near the user within his/her view field.

According to the above description, a user who is reading a newspaper and would like to get additional information about a word, title, or topic in the newspaper, in this case, the user uses the mobile phone to capture this word, title, or topic. The conversion program then analyzes the captured text to define its keyword and sends this keyword to the managing program. The managing program displays, on the mobile phone screen, a list and annotations of other users who are viewing text identified with the same keyword of the text that the user is viewing. In the meanwhile, the user can update the database with another annotation related to the text s/he is viewing where this annotation is stored in the database according to the keyword of this text.

Figure 2:
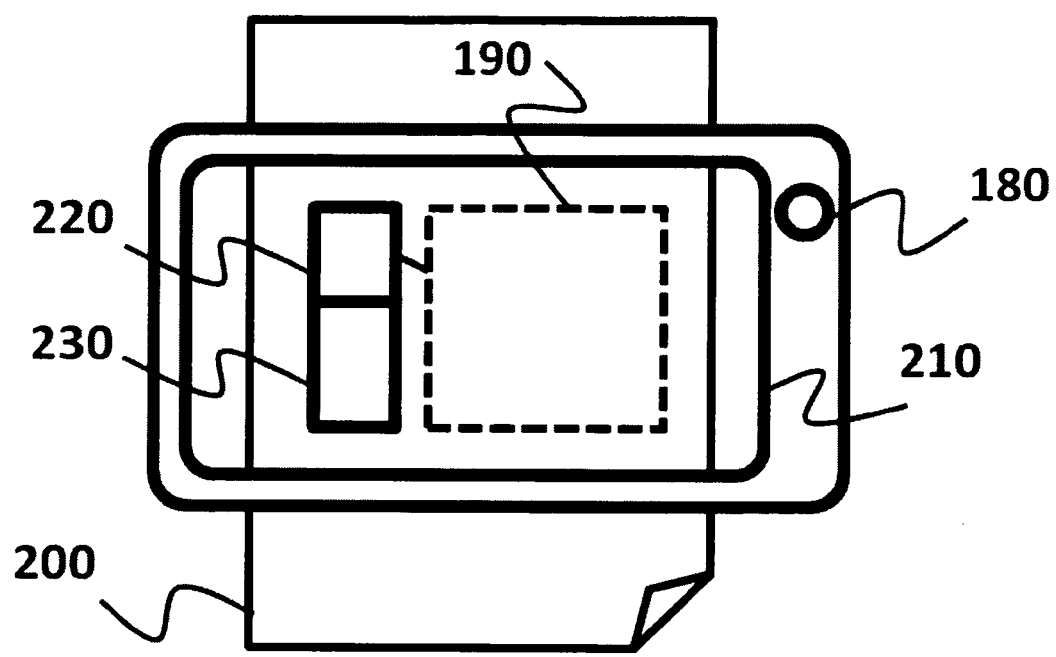
FIG. 2 illustrates an example of a mobile phone camera used to capture text from a newspaper where the mobile phone screen is utilized to function as a second screen.
Figure 3:
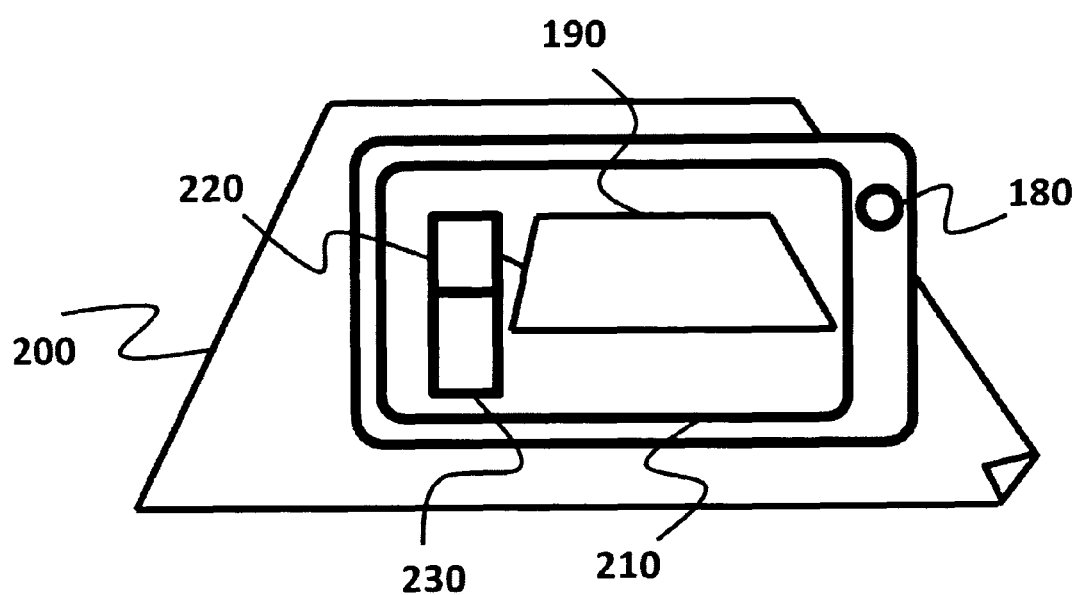
FIG. 3 illustrates how the annotations and the list of users are augmented with the newspaper on the mobile phone screen.

FIG. 2 illustrates an example of a mobile phone camera 180 used to capture a text 190 of a newspaper 200 where the mobile phone screen 210 is utilized to function as a second screen. As shown in the figure, a list of users 220 who are simultaneously viewing the same text or similar text identified with the same keyword appears on the mobile phone screen with their annotations 230. FIG. 3 illustrates how the list and annotations are augmented with the newspaper on the mobile phone screen where they move on the mobile phone screen with the position change of the newspaper on the screen according to the movement or titling of the mobile phone camera or screen.

In another embodiment of the first technology of the present invention, the scene includes objects that are viewed by a tablet camera. The tracking program tracks the object of the scene that is located in the middle of the tablet screen to capture its picture. The conversion program on the tablet analyzes the object's picture to define it with a keyword using an object recognition technique such as edge matching technique as known in the art. The managing program is located on a server connected to the tablet and other devices that are simultaneously utilizing the present invention. The managing program accesses a database that associates each keyword of an object with a list and annotations of users who are simultaneously viewing the same object or viewing different objects identified with the same keyword.

The list and annotations change according to the object that the user is viewing at the moment. The annotations can be visual annotations in the form of text, image, or video provided by users and displayed on the tablet screen. The text can be scripted by a user, the image can be the picture taken of the object by a user's camera, and the video can be a video of the object recorded by a camera, especially if this object is moving or appeared in a movie. The annotations can also be vocal annotations in the form of vocal messages provided by users and heard through the tablet speaker. The screen of the tablet can function as a first screen to display the scene and also functions as a second screen to display the visual annotations. In this case, the list and annotations appear in a location that does not hide the object on the tablet screen. It is also possible to only use the tablet screen as a second screen, while another additional screen, such as a mobile phone screen, a computer screen, or a TV screen, is utilized as a second screen. In this case, the additional or second screen is positioned within the users view field.

According to the above description, a user who is viewing an object like a pyramid using a device display equipped with the present invention will access a annotations and a list of other users who are simultaneously viewing objects in the form of pyramids. When utilizing the same device screen as a second screen, the annotations and list of other users will appear on the tablet screen. In such cases, the pyramids that the users are simultaneously viewing do not have to be of the exact size, color, or appearance. For example, a first user could be viewing a picture of the Egyptian Pyramids, a second user cloud simultaneously be viewing a small glass pyramid located on a table, while a third user is viewing a building in the shape of a pyramid. Hence the objects of the first, second, and third users will be identified by the conversion program as pyramids, and accordingly, the three users will be included in one list that is accessible to all of them.

Figure 4:
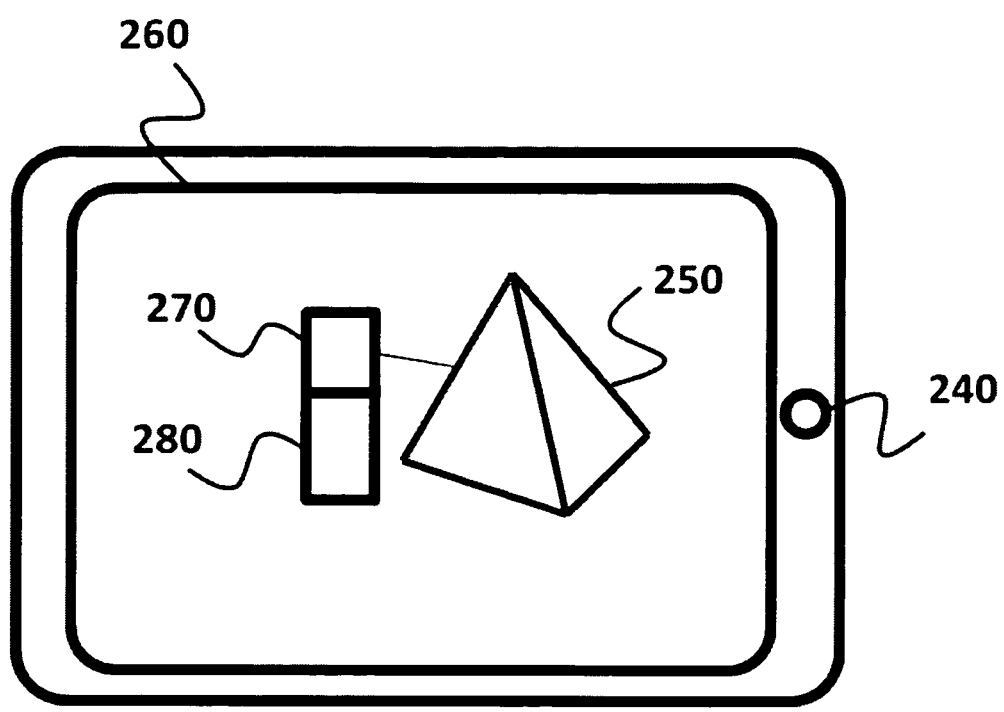
FIG. 4 illustrates an example of a tablet camera used to capture an object in the shape of a pyramid where the tablet screen is also utilized to function as a second screen.
Figure 5:
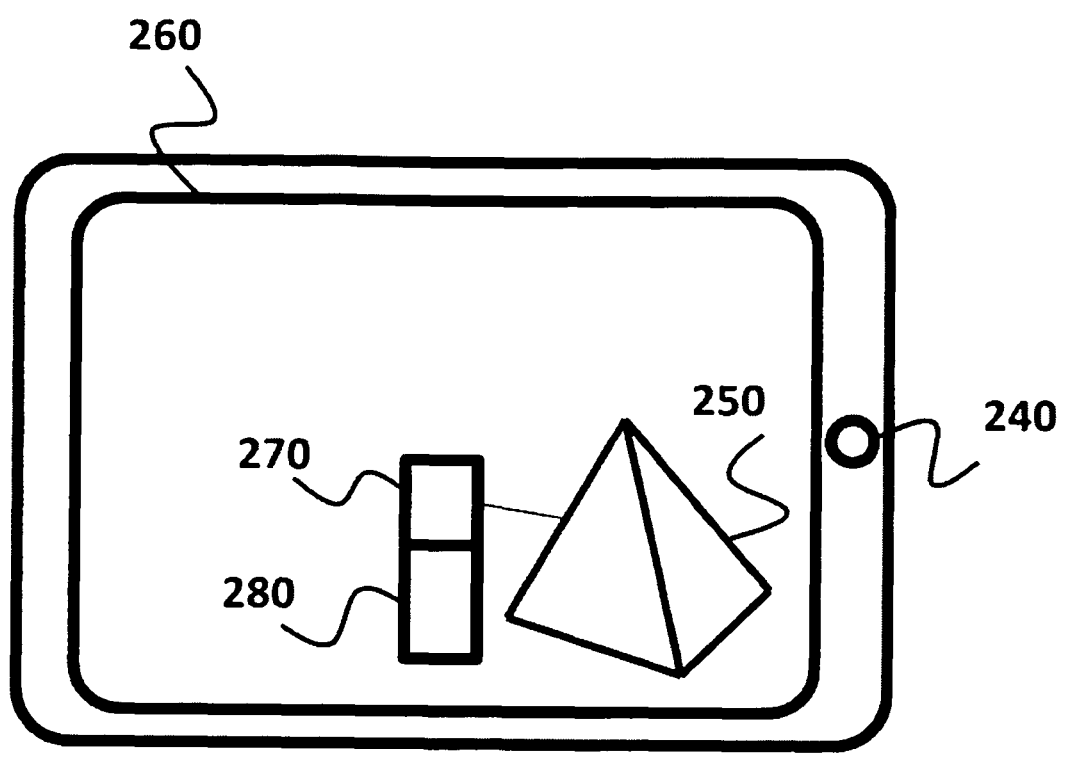
FIG. 5 illustrates how the annotations and the list of users are augmented with the pyramid on the tablet screen.

FIG. 4 illustrates an example of a tablet camera 240 used to capture an object in the shape of a pyramid 250 where the tablet screen 260 is also utilized to function as a second screen. As shown in the figure, a list of users 270 who are simultaneously viewing objects in the shapes of pyramids appears on the tablet screen with their annotations 280. FIG. 5 illustrates how the list and annotations are augmented with the pyramid on the tablet screen where moving or tilting the tablet camera or screen relative to the pyramid makes the position of the list and the annotations change according to the position change of the pyramid on the tablet screen.

In yet another embodiment of the first technology of the present invention, the scene includes human faces that are viewed by a camera of a head mounted computer display in the shape of eye glasses equipped with a camera, headphones and a microphone. The tracking unit is a program on the head mounted computer to detect the face that is located near the middle of the display. The conversion program analyzes the face to define its features using a facial recognition technique as know in the art. The managing program is located on a server connected to the head mounted computer display and other devices that are utilizing the present invention. The managing program accesses a database that associates each unique face's features with annotations and list of users who provided the annotations The list and annotations are changing according to the change of the face that the user is viewing at the moment. The annotations can be visual annotations in the form of text, image, or video provided by users and presented on the display of the head mounted computer. The text can be scripted by a user, the image can be a picture taken by a camera for the person's face that the user is viewing, and the video can be recorded by a user's camera displaying the person's face that the user is viewing especially if this person is moving or appears in a movie or video. The annotations can also be vocal annotations in the form of vocal messages provided by a user and heard through the headphones. The display of the head mounted computer can function as a second screen to present the list and visual annotations. It is also possible to utilize another screen to function as a second screen such as a mobile phone screen, a tablet screen, or a computer screen. In this case, the second screen is positioned near the user within his/her view field.

According to the above description, a user of the present invention viewing the face of a celebrity with a device camera can see on the device screen, the annotations and list of other users who are simultaneously viewing the same celebrity's face. In such cases, the celebrity is not required be seen in person by all users on the list. For example, a first user may see the celebrity on a TV, a second user may see a picture of the celebrity in a magazine, and a third user may see the celebrity in person. Accordingly, the list will include the first, second, and third users with their annotations of the celebrity.

Generally, using the present invention with facial features recognition creates a substantial number of innovative applications. For example, it becomes possible to tag people faces with annotations. This is achieved by a first user utilizing the present invention with a person's face, then updating the database with annotations related to this person's face. Once a second user utilizes the present invention to view the same person's face, the annotations of the first user appear to the second user. In this case, the first and second users do not need to be viewing the person's face at the same time. In other words, the database stores the first user annotation associated with the features of the person's face, and later displays this annotations to the second user, when s/he views the person's face. This innovative application is greatly useful when utilized with a head mounted computer display in the shape of eye glasses, giving real time information regarding the people we see or meet for the first time. Moreover, each person can tag him/herself with certain information that can be viewed by others.

Figure 6:
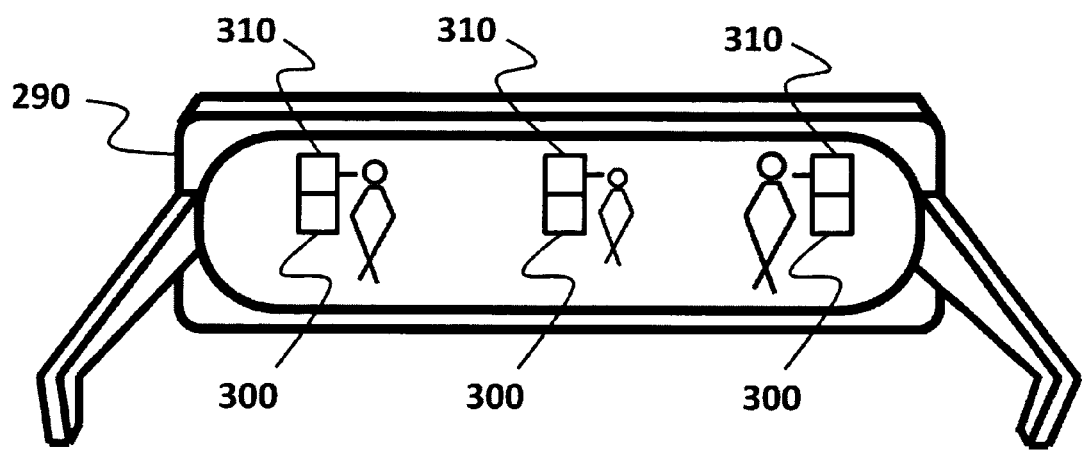
FIG. 6 illustrates an example of a head mounted computer display in the shape of eye glasses equipped with the present invention to view the people's annotations and the list of users who provided the annotations.

FIG. 6 illustrates an example of a head mounted computer display in the shape of eye glasses 290, equipped with the present invention to view people's annotations 300 and the list 310 of users who provided these annotations. The annotations and the list appear to move on the head mounted display with the movement of the person tagged with these annotations. As shown in the figure, the annotations and the list appear on top of each face, instead of only appearing on one face located in the middle of the display. This could be an option that can be selected depending on the user's needs or preference using an eye blinking signal with an eye tracking camera. However, in this application, it is possible to allow full control over the annotations that are tagged to a user's, or control which people can view these annotations. This is achieved by the user providing a copy of his/her photo ID to the database administrator to give the user control over the annotations that are associated with his/her face features.

Similar to utilizing the facial features recognition technique with the present invention, the body features recognition technique is also utilized with the present invention. This is helpful when looking at a person from far away where so that his/her face features are not clear enough. In this case, the conversion program utilizes one of the well known body features recognition technique to identify and send the body's features to the database once a user looks at a person's body. Accordingly, the annotations and list of users who are simultaneously viewing the same body will be grouped in one list. This concept enables tagging people's bodies with annotations which can be useful for various applications. For example, when watching sports games such as soccer, American football, basketball, or the like, it becomes possible for users to tag players with annotations based on their body features. Accordingly, the users who are watching the same sport game can see the annotations and the list of other users who are simultaneously looking at the same player. In this case, each user can be located in a different location in the stadium watching the sport game, or in a different home location watching the sport game on TV.

Figure 7:
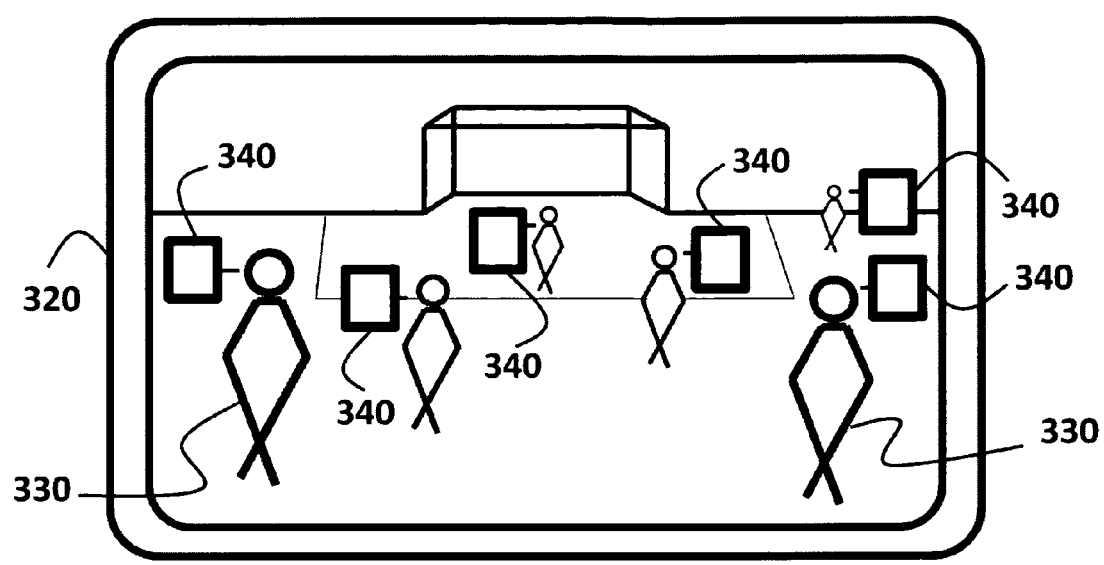
FIG. 7 illustrates a soccer game viewed on a display equipped with the present invention where each player appears with annotations attached and moved with his/her body as an augmented reality application.

FIG. 7 illustrates a soccer game viewed on a display 320 equipped with the present invention where each player 330 appears on the display with annotations and a list 340 attached and moved with his/her body as augmented reality application. In this case and other cases or applications of the present invention, a user who provides an annotation can restrict viewing this annotation to certain users. This achieved by providing the database with the IDs or screen names of other users who are allowed or blocked from viewing the annotation. Accordingly, each user can control the annotations or the communication to be limited with his/her friends or colleagues only. Generally, as shown in the figure the annotations and the list appear on top of each player's body instead of only appearing on one body located in the middle of the display. This could be an option that is selected according to the user's needs or preference using a button or an icon on the display. Also, the user can click on a certain player on the display to limit seeing the annotations of this selected player only.

Figure 8:
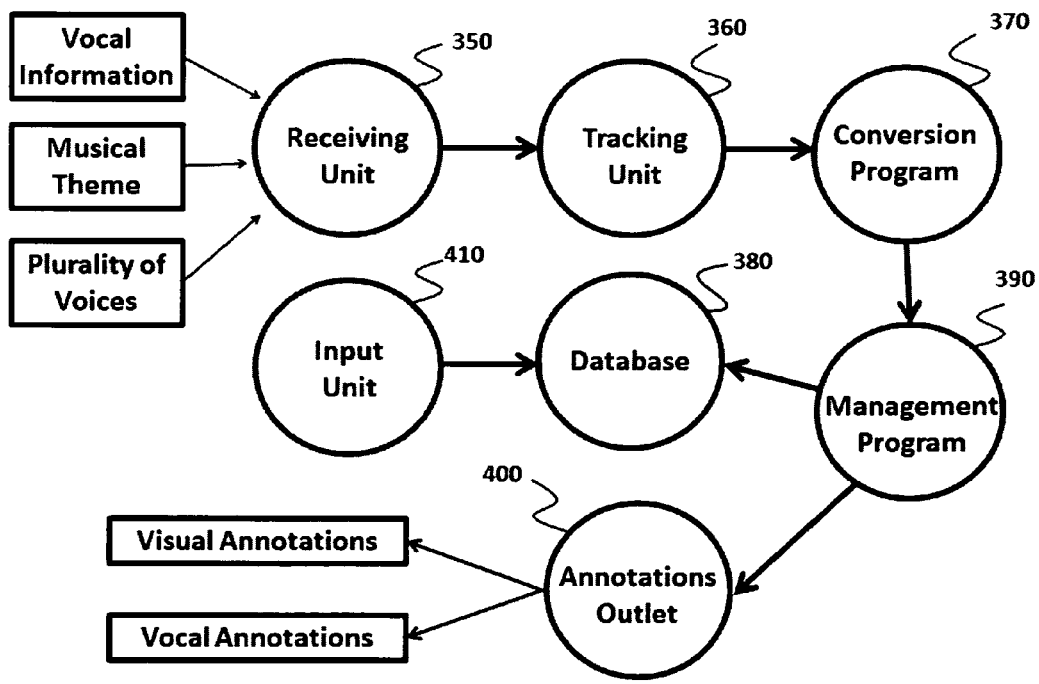
FIG. 8 illustrates a block diagram of a system for augmenting a user experience listening to an audio to provide real time annotations and list of users who are simultaneously listening to similar parts of audios.

According to a second technology of the present invention, FIG. 8 illustrates a block diagram of a system for augmenting a user experience listening to an audio to provide a real time list and annotations of users who are simultaneously listening to similar parts of audios. The system is comprised of; a receiving unit 350 capable of recording and converting the audio into digital data; a tracking unit 360 that receives a signal from a user to indicate selecting a part of the audio and extracts the digital data that represents this part; a conversion program 370 connected to the tracking unit to identify the digital data of the part of the audio with a keyword; a database 380 that stores keywords associated with a list and annotations of users who are simultaneously listening to parts of audios identified with the same keyword; a managing program 390 that receives the keyword from the conversion program and accesses the database to retrieve the list and annotations that are related to a part of the audio selected by the user; an annotation outlet 400 comprised of a second screen and a speaker to provide the visual annotations or the vocal annotations of the part of the audio; and an input unit 410 comprised of a keyboard and a microphone to provide the database with visual annotations or vocal annotations related to a part of the audio.

The audio content can be vocal information, musical themes, or a plurality of voices. The receiving unit can be a device equipped with digital recorder and a software program to convert the audio into digital data such as a mobile phone, tablet, or head mounted computer display in the shape of eye glasses. The receiving unit utilizes a speech-to-text conversion technique, a music-to-note conversion technique, or a biometric voice identification technique when the audio successively contains vocal information, musical themes, or a plurality of voices. The tracking unit is a program connected to the receiving unit to extract a part of the digital data representing a selection of the user upon an input provided by him/her. The conversion program identifies the extracted digital data with a keyword representing the part of the vocal information, the part of the musical themes, or the voice of the plurality of voices that is selected by the user. The database is located on a server to store visual annotations and vocal annotations. The visual annotation can be a script, images, or videos. The vocal annotations can be vocal information or music. The managing program is located on the server accessing the database and connected to each conversion program and each annotations outlet. The annotations outlet can be a device equipped with a screen to present the visual annotations and a speaker to convey the vocal annotations such as a mobile phone, tablet, or computer. The input unit is a device with a unique ID equipped with a keyboard and a microphone such as a mobile phone, tablet, or computer.

In one embodiment of the second technology of the present invention, the audio content is vocal information of a person talking in front of the user, or on a TV or radio. A mobile phone equipped by the present invention is utilized to function as a receiving unit to record and convert the vocal information into digital text using a speech-to-text conversion program or technique as known in the art. Once the user presses a certain icon on the mobile phone screen while listening to a part of the vocal information, the tracking program extracts the digital data of this part of the vocal information. The conversion program analyzes and identifies the extracted digital data with a keyword and sends this keyword to the managing program. The managing program is located on a server and connected to the mobile phone and other devices that are utilizing the present invention while listening to the same vocal information or other vocal information. The managing program accesses a database that associates each keyword with annotations and list of users who provided these annotations.

The list and annotations are changing according to the change of the part of the vocal information that the user is listening to it or selecting it at the moment. The annotations can be visual annotations in the form of text, image, or video provided by users and presented on the screen of the mobile phone. Also the annotations can be vocal annotations in the form of vocal messages provided by users and heard through the speaker of the mobile phone. Although the screen of the mobile phone can function as a second screen to present the list and visual annotations, it is also possible to utilize another screen to function as a second screen such as a tablet screen or a computer screen. In this case, the second screen is positioned near the user within his/her view field. However, in case the user needs to get annotations for the entire vocal information instead of selecting a certain part of it, in this case, the user clicks on a certain icon for this purpose on the mobile phone screen.

In another embodiment of the second technology of the present invention, the audio content is musical themes played on a tablet. The tablet is equipped with the present invention and functions as a receiving unit to record and convert the musical themes into a musical note using a music-to-digital note conversion program or technique as known in the art. Once the user presses a designated icon on the tablet screen while listening to a part of the music, the tracking program extracts the digital note of this part. The conversion program analyzes and identifies the extracted digital note with a keyword and sends this keyword to the managing program. The managing program is located on a server and connected to the tablet and other devices that are utilizing the present invention, while listening to musical pieces. The managing program accesses a database that associates each keyword with annotations and a list of users who provided these annotations.

The list and annotations change according to the part of the music that the user is listening to it or selecting at the moment. The annotations can be visual annotations in the form of text, image, or video provided by users and presented on the tablet screen. Also, the annotations can be vocal annotations in the form of vocal messages provided by users and heard through the speaker of the tablet. Although the screen of the tablet can function as a second screen to present the list and visual annotations, it is also possible to utilize another screen to function as a second screen such as a mobile phone screen, a computer screen, or a TV screen. In this case, the second screen is positioned near the user within his/her view field. However, in case the user needs to get annotations for the entire musical themes instead of selecting a certain part of it, the user can click on a certain icon for this purpose on the tablet screen.

In one embodiment of the second technology of the present invention, the audio content is a plurality of voices. A laptop, equipped by the present invention, is utilized to function as a receiving unit using a biometric voice recognition technique, as known in the art, to identify each one of the plurality of voices with a unique ID. Once the user selects a voice of this plurality of voices, the tracking program extracts the ID of this voice from the receiving unit. The user's selection of a voice can be done by clicking an icon on the laptop screen when this voice is heard. The managing program is located on a server connected to the laptop and other devices that are utilizing the present invention. The managing program accesses a database that associates each unique ID of a voice with a list and annotations of users who provided these annotations.

The list and annotations are changing according to the change of the voice ID that the user is listening to it or selecting it. The annotations can be visual annotations in the form of text, image, or video provided by users and displayed on the laptop screen. Also, the annotations can be vocal annotations in the form of vocal messages provided by users and heard through the speaker of the laptop. The users are simultaneously listening to the same voice or previously listened to the same voice and provided annotations related to this person's voice. Although the screen of the laptop can function as a second screen to present the list and the visual annotations, it is also possible to utilize another screen to function as a second screen such as a mobile phone screen, a tablet, or a TV screen. In this case, the second screen is positioned near the user within his/her view field. However, in case the user needs to get annotations for all the voices instead of selecting a certain voice, in this case, the user clicks on a designated icon, for this purpose, on the laptop screen.

Using the present invention with the biometric voice recognition technique creates a substantial number of innovative applications. For example, it becomes possible to tag people voices with annotations. This is achieved by a first user utilizing the present invention with a person's voice then updating the database with annotations related to this person's voice. Once a second user utilizes the present invention to listen to the same person's voice, the annotations of the first user appear to the second user. In this case, the first and second users should not be listening to the person's voice at the same time. In other words, the database stores the annotations of the first user associated with the person's voice ID and later displays or provides these annotations to the second user once s/he listens to this person's voice. This innovative utilization of the present invention enables getting real time information for people we hear for the first time especially on TV or Radio, or during personal or business meetings.

Figure 9:
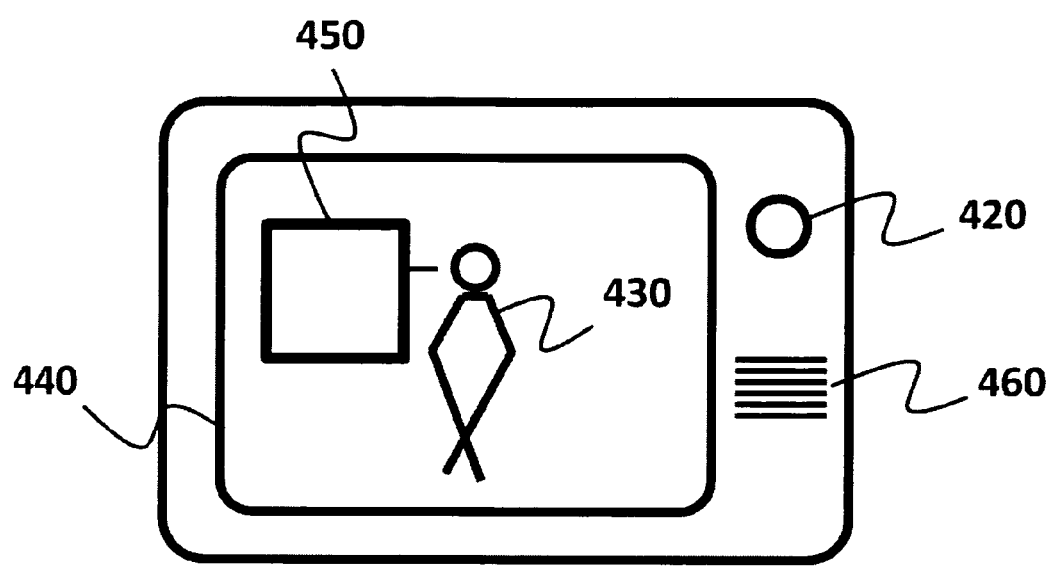
FIG. 9 illustrates an example of a sound capturing camera targeting a person that appears on its screen.

In a unique embodiment of the second technology, the present invention is further equipped with a sound tracking camera that captures voices within the camera view field, as known in the art. In this case the user can point or direct the camera lens towards a specific person in a group of people. Once this person talks then his/her voice ID is identified by the receiving unit as previously described, and accordingly, the annotations of the person appear to the user. FIG. 9 illustrates an example of a sound capturing camera 420 targeting a person 430 that appears on the camera screen 440. Once the person talks, visual annotations 450 related to this person are displayed on the camera screen, or vocal annotations related to the person are heard through a speaker 460 attached to the sound capturing camera. As shown in the figure, the person can be located far away from the user's position where the sound capturing camera can reach farther distances than any audio device tracking a person's voice especially in a crowd.

Figure 10:
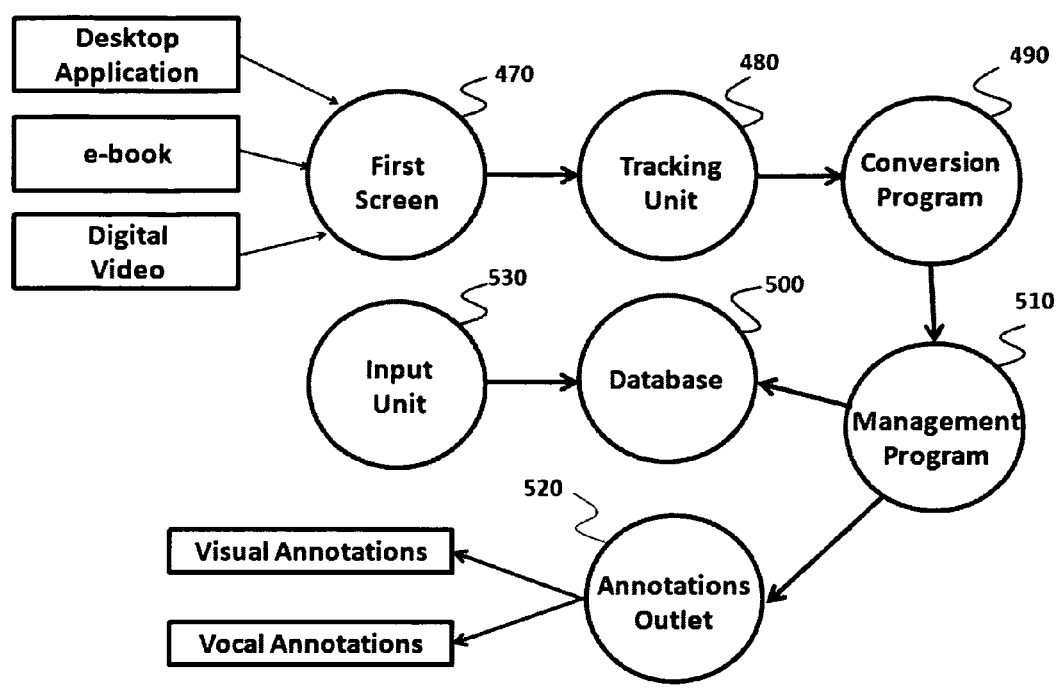
FIG. 10 illustrates a block diagram of a system for augmenting a user experience viewing digital data to provide real time annotations and a list of users who are simultaneously viewing similar parts of digital data.

According to a third technology of the present invention, FIG. 10 illustrates a block diagram of a system for augmenting a user experience viewing digital data to provide a real time list and annotations of users who are simultaneously viewing similar parts of digital data. The system is comprised of a first screen 470 capable of presenting digital data; a tracking unit 480 that tracks the selected part of the digital data by the user on the first screen; a conversion program 490 connected to the tracking unit to provide a keyword representing the selected part; a database 500 that stores keywords associated with a list and annotations of users who are simultaneously selecting parts of digital data identified with the same keyword; a managing program 510 that receives the keyword from the conversion program and accesses the database to retrieve the list and annotations that are related to the selected part; an annotations outlet 520 comprised of a second screen and a speaker to provide the visual annotations or the vocal annotations of the selected part; and an input unit 530 comprised of a keyboard and a microphone to provide the database with visual annotations or vocal annotations related to a selected part.

The digital data can be a desktop application, an e-book, or digital video displayed on the first screen. The first screen is a display of a device such as a mobile phone, tablet, computer, TV, or head mounted computer equipped with the present invention. The tracking unit is a program functioning on the device. The conversion program provides a keyword representing a part of the desktop application the user is interacting with, or a part of the e-book the user is reading, or a part of the digital video the user is watching. The database is located on a server to store visual annotations and vocal annotations. The visual annotation can be a script, images, or videos provided by users. The vocal annotations can be vocal information or music provided by users. The managing program is located on the server accessing the database and connected to each conversion program and each annotations outlet. The annotations outlet utilizes the screen and the speaker of the same device of the first screen, or utilizes a screen and speaker of another device. The screen is used for presenting the visual annotations, and the speaker is used to produce the vocal annotations. Also, the input unit utilizes the keyboard and the microphone of the same device of the first screen, or utilizes a keyboard and a microphone of another device. The keyboard is used to provide written annotations while the microphone is used to provide vocal annotations.

In one embodiment of the third technology of the present invention, the digital data is a desktop application opened on a computer display. The tracking program detects which part of the desktop application the user is selecting at the moment. The part of the desktop application can be a feature, function, or process that is detected by selecting certain successive icons or menu elements. The conversion program translates each successive selection of icons or menu elements into a keyword representing the feature, function, or process that the user is using at the moment. The managing program is located on a server and connected to the computer and other devices that utilize the present invention with the same desktop application. The managing program accesses a database that associates each keyword of a feature, function, or process of a desktop application with a list and annotations of users who are simultaneously selecting the same part of the same desktop application.

The list and annotations of users change according to the change of the part of the desktop application that the user is selecting at the moment on the computer display. The annotations can be visual annotations in the form of text, image, or video provided by users and displayed on the second screen of the annotations outlet. Also, the annotations can be vocal annotations in the form of vocal messages provided by users and heard through the speaker of the annotations outlet. The annotations outlet can utilize the first screen and the speaker of the same computer. In this case, the list and annotations appear on the computer screen in a position that does not hide the desktop application. The annotations outlet can also utilize a screen and a speaker of another device such as a mobile phone, tablet, or TV positioned within the user's view field.

Figure 11:
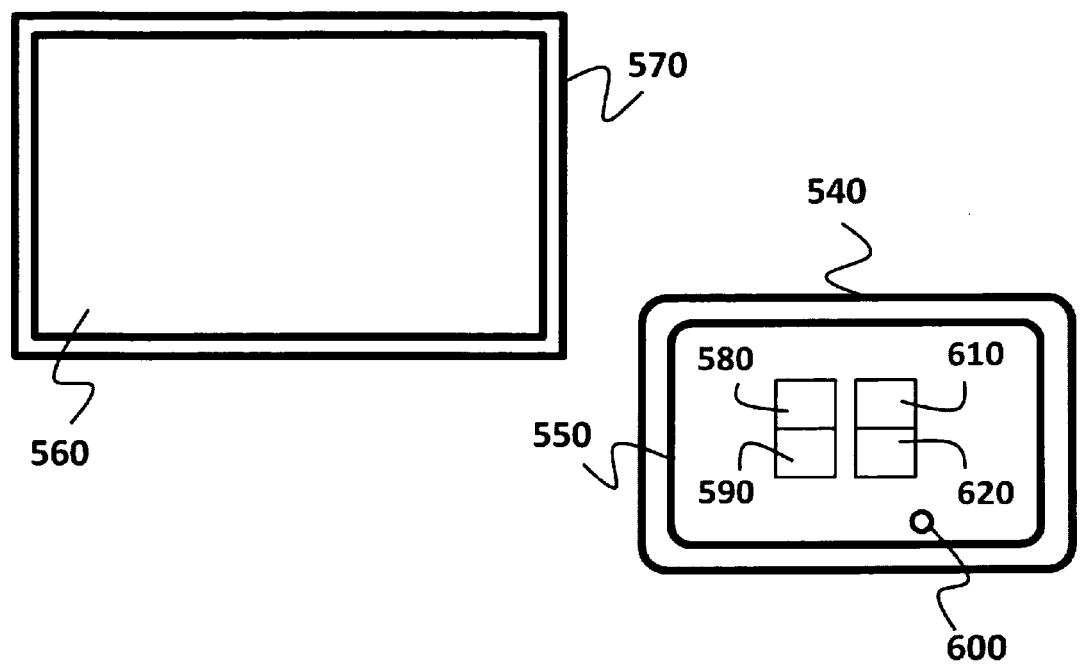
FIG. 11 illustrates an example of a tablet equipped with the present invention where the tablet screen is utilized as a second screen while working on a desktop application on a computer screen.

FIG. 11 illustrates an example of a tablet 540 equipped with the present invention where the tablet screen 550 is utilized as a second screen while working on a desktop application 560 on a computer screen 570. As shown in the figure, the tablet screen is simultaneously presenting a first list 580 and first annotations 590 for users who are simultaneously interacting with the same part of the desktop application. Pressing the icon 600 invokes a second list 610 and second annotations 620 for users who previously interacted with the same part of the desktop application that the user is interacting with it at the moment. The second list and the second annotations, in this example, enable the user to get information from other users who previously interacted with the same part s/he is interacting with it on the desktop application.

In another embodiment of the third technology of the present invention, the digital data is an e-book opened on a tablet. The tracking program detects which part of the e-book the user is selecting at the moment. The part of the e-book can be a word, paragraph, or section that the user selects or highlights. Also, the part of the e-book can be a page opened on the e-book and automatically identified by a page number. The conversion program analyzes and identifies the word, paragraph, section, or page that the user is selecting or reading with a keyword. The managing program is located on a server and connected to the tablet and other devices that utilize the present invention with the same e-book or other e-books. The managing program accesses a database that associates each keyword with a list and annotations of users who are simultaneously selecting or reading words, paragraphs, sections, or pages identified with the same keyword.

The list and annotations of users change according to the change of the part of the e-book that the user is selecting or reading on the tablet screen. The annotations can be visual annotations in the form of text, image, or video provided by users and displayed on the second screen of the annotations outlet. Also, the annotations can be vocal annotations in the form of vocal messages provided by users and heard through the speaker of the annotations outlet. The annotations outlet can utilize the screen and speaker of the same tablet. In this case, the list and annotations appear on the tablet screen in a position that does not obscure the e-book. Also, the annotations outlet can utilize a screen and a speaker of another device such as a mobile phone or computer positioned near the user, within his/her view field. In this case, the keyboard and microphone of the mobile phone or computer will be used as an input unit to provide the database with annotations related to the part of the e-book that the user is reading or selecting at the moment.

Figure 12:
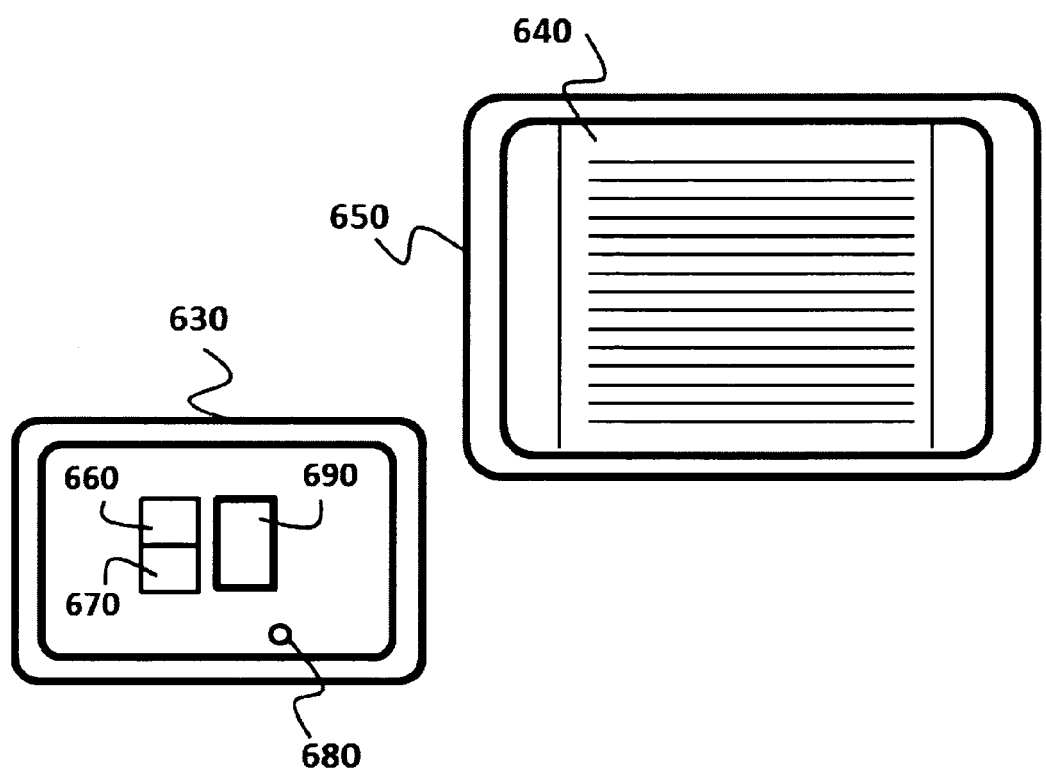
FIG. 12 illustrates an example of a mobile phone utilized as a second screen while reading an e-book on a tablet screen.

FIG. 12 illustrates an example of a mobile phone 630 utilized as a second screen while reading an e-book 640 on a tablet screen 650. As shown in the figure, the list 660 and annotations 670 of other users, who are simultaneously reading the same part of the e-book, appear on the mobile phone screen. Pressing the icon 680 invokes a list of other keywords 690 related to the keyword of the e-book part that the user is selecting it or reading it. This is to enable the user to get more information from others who are reading different parts of the same e-book or reading parts of different e-books that are related to what the user is reading at the moment.

In yet another embodiment of the third technology of the present invention, the digital data is a movie, video, or show displayed on a digital TV. For example, in the case of presenting a show on the digital TV, the tracking program tracks the name of the show and tracks the time passed since its beginning. This tracked time identifies which part of the show the user is watching at the moment. The conversion program identifies this part with a keyword representing a part or phase of the show. For example, each five minutes of the show could represent a certain part of the show. The managing program is located on a server and connected to the digital TV and other devices that utilize the present invention with the same show. The managing program accesses a database that associates each keyword that represents a specific phase of a show with a list and annotations of users who are simultaneously watching the same phase of the same show.

The list and annotations of users change according to what parts a user is watching on the digital TV. The annotations can be visual annotations in the form of text, image, or video provided by users and displayed on the second screen of the annotations outlet. Also, the annotations can be vocal annotations in the form of vocal messages provided by users and heard through the speaker of the annotations outlet. The annotations outlet can utilize the same screen and speaker of the same digital TV. In this case, the list and annotations appear on the digital TV screen in a position that does not hide the show. Also, the annotations outlet can utilize a screen and a speaker of another device, such as a mobile phone, tablet, or computer positioned near the user within his/her view field. In this case, the keyboard and microphone of the mobile phone, tablet, or computer will be used as an input unit to provide the database with annotations related to the part of the show that the user is watching it at the moment.

Figure 13:
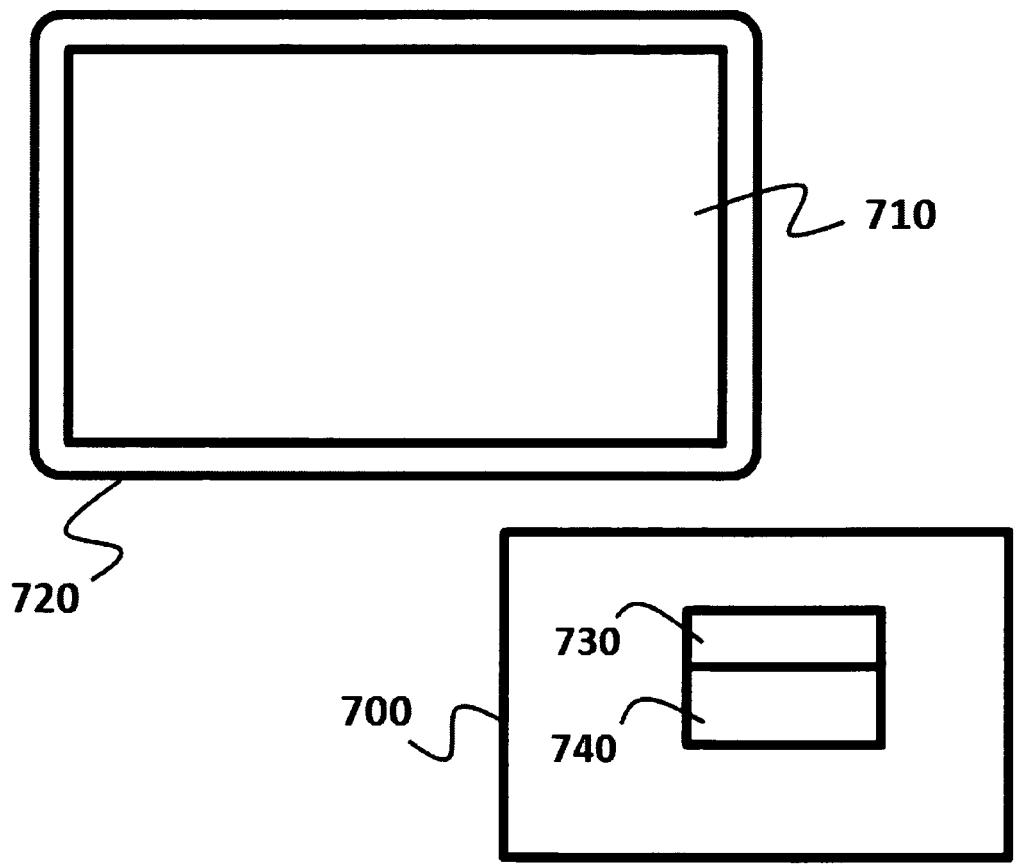
FIG. 13 illustrates an example of a tablet screen utilized as a second screen while watching a show on a TV.

FIG. 13 illustrates an example of a tablet screen 700 utilized as a second screen while watching a show 710 on a TV screen 720. As shown in the figure, the list 730 and annotations 740 of users who are simultaneously watching the same part of the same show appear on the tablet screen. In this example, incorporating the first technology of the present invention, of utilizing a facial recognition technique to identify the people in the show, helps provide access to annotations related to a specific person in the show based on his/her facial features. Also, incorporating the second technology of the present invention, of utilizing a biometric voice recognition technique, helps in providing and/or accessing annotations related to a specific person in the show based on his/her voice identity.

Generally, it is important to note that updating the database with visual annotations or vocal annotations that can be accessed by all users who are viewing or hearing similar things, provides an innovative tool for real time communications, especially when using the vocal annotations that include vocal messages. This unique type of communication enables users to get connected with each other based on a common action or a common environment around them. Using the mobile computer devices such as mobile phones or head mounted computers in the shape of eye glasses adds a great value for such communication that can be done in various situations during studying, walking, driving a car, or the like.

Figure 14:
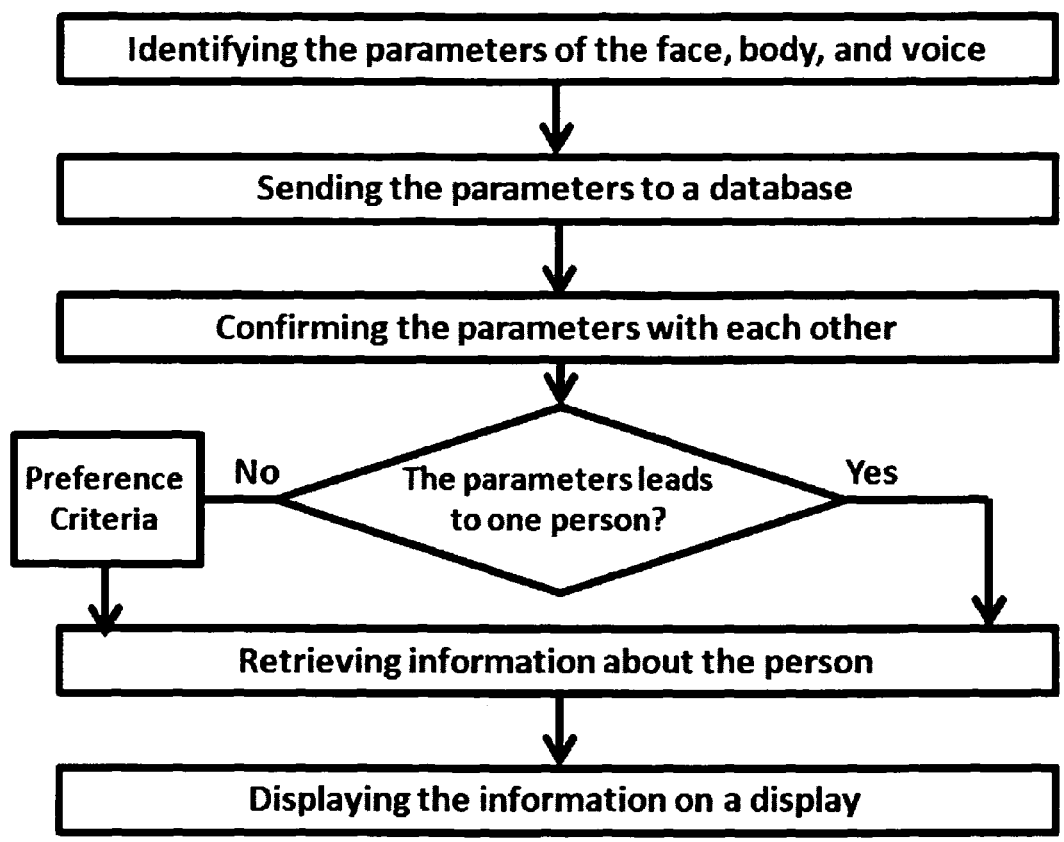
FIG. 14 illustrates a flow chart describing a method for combining multiple recognition techniques to retrieve annotations related to a person based on the parameters of his/her face, body, and/or voice.

Based on the previous description of the present invention, it becomes possible to store information related to people's faces, bodies, or voices, and accordingly, it becomes possible to get real time information about the people we see or hear. This unique method has substantial applications that serve various educational, entertainment, and security fields. For example, FIG. 14 illustrates a flow chart describing this method comprising of five steps. The first step is identifying the parameters of a person's face, body, and voice. The second step is sending the parameters to a database that stores information about each person's parameters. The third step is confirming that the parameters of the face, body, and voice lead to one person in the database. The fourth step is retrieving information about the person. The fifth step is displaying this information on a display. As shown in the figure, if the parameters of the face, body, and voice do not lead to one person then a decision is taken based on preference criteria that can be set up by the user according to each case or situation. For example, if the person's face and body are not clear enough then the voice parameters will be considered for the person's identity.

It is important to note that the present invention can be utilized for one's personal use, in other words, the user can store annotations related to what s/he sees or hears where these annotations are only accessible to him/her. For example, a user can store information related to faces or objects s/he sees, or store information related to voices or sounds s/he hears where this stored information is provided back to him/her once s/he sees the same faces or objects or hears the same voices or sounds. Utilizing this one personal use of the present invention with the modern eye glasses of the head mounted computer displays can assist the user in recognizing and interacting with the real world around him/her.

As disclosed previously the present invention introduces; a first technology for augmenting a user experience viewing a scene, a second technology for augmenting a user experience hearing an audio, and a third technology for augmenting a user experience viewing digital data. Combining the first, second, and third technologies in one use or solution provides the user with innovative tools and applications that serves a variety of fields.

What is claimed is:

1. A system to annotate different images of a person's face wherein the different images can be simultaneously presented in different formats at two or more locations and the system comprising:
   A plurality of cameras each of which is positioned to capture an image of the different images and produce digital data representing the person's face wherein each camera of the plurality of cameras is connected to;
   a facial-recognition system to receive the digital data and generates an identifier representing the identity of the person's face;
   an input unit to associate the identifier with an annotation to be stored in a database; and
   an output unit to search the database and present the annotations associated with the identifier when the each camera captures the image.

2. The system of claim 1 wherein the different formats can be digital data presented on a digital display, pictures printed in a book, magazine or newspaper, or real-live scene located in front of the each camera.

3. The system of claim 1 wherein the annotation is a text, image, audio or video.

4. The system of claim 1 wherein each camera of the plurality of cameras has an identity to be stored in the database and presented with the annotations.

5. The system of claim 1 wherein the output unit presents the annotations on a display of an electronic device such as a computer, mobile phone, television, digital camera, or optical head-mounted display.

6. The system of claim 1 wherein the plurality of cameras is digital cameras of mobile phones, tablets, computers or optical head-mounted displays.

7. The system of claim 1 wherein the person's face is a person's body and the facial-recognition system is a body-recognition system.

8. The system of claim 1 wherein the person's face is an object and the facial-recognition system is an object-recognition system.

9. The system of claim 1 wherein the person's face is a text and the facial-recognition system is an optical character recognition system.

10. A system to annotate a voice of a person wherein the voice can be simultaneously generated in different formats at two or more locations and the system comprising:
   A plurality of voice sensing devices each of which is positioned to sense the voice and produce digital data representing the voice biometrics wherein each device of the plurality of voice sensing devices is connected to;

a biometric voice-recognition system that receives the digital data and generates an identifier representing the voice biometrics;

an input unit to associate the identifier with an annotation to be stored in a database; and an output unit to search the database and present the annotations associated with the identifier when the each device senses the voice.

11. The system of claim 10 wherein the different formats of the voice can be generated by electronic devices such as televisions, radios, computers or mobile phones, or can be generated by a person located near a device of the plurality of voice sensing devices.

12. The system of claim 10 wherein the annotation is a text, image, audio or video.

13. The system of claim 10 wherein each device of the plurality of voice sensing devices has an identity to be stored in the database and presented with the annotations.

14. The system of claim 10 wherein the output unit presents the annotations on a displays of an electronic device such as a computer, mobile phone, television, digital camera, or optical head-mounted display.

15. The system of claim 10 wherein the plurality of voice sensing devices is incorporated with televisions, radios, mobile phones, tablets, computers or optical head-mounted displays.

16. A system to annotate a music wherein the music can be simultaneously generated in different formats at two or more locations and the system comprising:

A plurality of sound sensing devices each of which is positioned to sense the music and produce digital data representing the music wherein each device of the plurality of sound sensing devices is connected to;

a music recognition system that receives the digital data and generates an identifier representing the music;

an input unit to associate the identifier with an annotation to be stored in a database; and an output unit to search the database and present the annotations associated with the identifier when the each device senses the music.

17. The system of claim 16 wherein the different formats of the music can be generated by electronic devices such as televisions, radios, computers or mobile phones, or can be generated by one or more musical instruments located near a device of the plurality of sound sensing devices.

18. The system of claim 16 wherein the annotation is a text, image, audio or video.

19. The system of claim 16 wherein the output unit presents the annotations on a display of an electronic device such as a computer, mobile phone, television, digital camera, or optical head-mounted display.

20. The system of claim 16 wherein the plurality of sound sensing devices is incorporated with mobile phones, tablets, computers or optical head-mounted displays.

* * * * *